United States Patent
Han et al.

(10) Patent No.: US 9,170,270 B2
(45) Date of Patent: Oct. 27, 2015

(54) INERTIAL SENSOR AND METHOD FOR MEASURING ACCELERATION USING THE SAME

(75) Inventors: Seung Heon Han, Seoul (KR); Jung Eun Noh, Hanam-Si (KR); Jong Woon Kim, Seoul (KR); Sang Jin Kim, Suwon (KR); Yun Sung Kang, Suwon (KR); Won Kyu Jeung, Seoul (KR)

(73) Assignee: Samsung Electro-Mechanic Co., Ltd., Suwon-si (KR)

( * ) Notice: Subject to any disclaimer, the term of this patent is extended or adjusted under 35 U.S.C. 154(b) by 379 days.

(21) Appl. No.: 13/440,809

(22) Filed: Apr. 5, 2012

(65) Prior Publication Data
US 2013/0152687 A1 Jun. 20, 2013

(30) Foreign Application Priority Data

Dec. 14, 2011 (KR) .................. 10-2011-0134587

(51) Int. Cl.
*G01P 15/09* (2006.01)
*G01P 15/14* (2013.01)
*G01P 15/18* (2013.01)
*G01P 15/08* (2006.01)

(52) U.S. Cl.
CPC ............. *G01P 15/0922* (2013.01); *G01P 15/14* (2013.01); *G01P 15/18* (2013.01); *G01P 2015/084* (2013.01)

(58) Field of Classification Search
CPC ...................................... G01C 19/56
USPC ................ 73/514.34, 504.04, 504.12, 504.14
See application file for complete search history.

(56) References Cited

U.S. PATENT DOCUMENTS

| | | | | |
|---|---|---|---|---|
| 5,831,163 | A * | 11/1998 | Okada | 73/504.12 |
| 5,850,040 | A * | 12/1998 | Okada | 73/504.04 |
| 2003/0022361 | A1 * | 1/2003 | Houston et al. | 435/287.1 |
| 2010/0058861 | A1 * | 3/2010 | Kuang et al. | 73/504.12 |
| 2010/0263445 | A1 * | 10/2010 | Hayner et al. | 73/504.12 |
| 2012/0043855 | A1 * | 2/2012 | Kang et al. | 310/329 |
| 2012/0291547 | A1 * | 11/2012 | Kim et al. | 73/504.12 |

FOREIGN PATENT DOCUMENTS

KR       1020110072229       6/2011

* cited by examiner

*Primary Examiner* — Hezron E Williams
*Assistant Examiner* — Xin Zhong
(74) *Attorney, Agent, or Firm* — NSIP Law

(57) ABSTRACT

Disclosed herein is an inertial sensor, including: a membrane; a mass body disposed under the membrane; a sensing unit formed on the membrane and including a piezoelectric body; and a spring constant control unit formed to be spaced apart from the sensing unit and including a piezoelectric body. According to the preferred embodiment of the present invention, the DC acceleration (in particular, gravity acceleration) can be measured by using the change in the spring constant without changing the structure of the inertial sensor including the piezoelectric material of the prior art.

10 Claims, 5 Drawing Sheets

(a)

(b)

(c)

(A)

(B)

(C)

INERTIAL SENSOR AND METHOD FOR MEASURING ACCELERATION USING THE SAME

CROSS REFERENCE TO RELATED APPLICATION

This application claims the benefit of Korean Patent Application No. 10-2011-0134587, filed on Dec. 14, 2011, entitled "Inertial Sensor and Measuring Method for Acceleration Using the Same", which is hereby incorporated by reference in its entirety into this application.

BACKGROUND OF THE INVENTION

1. Technical Field

The present invention relates to an inertial sensor and a method for measuring acceleration using the same.

2. Description of the Related Art

Recently, an inertial sensor has been used as various applications, for example, military such as an artificial satellite, a missile, an unmanned aircraft, or the like, vehicles such as an air bag, electronic stability control (ESC), a black box for a vehicle, or the like, hand shaking prevention of a camcorder, motion sensing of a mobile phone or a game machine, navigation, or the like.

The inertial sensor generally adopts a configuration in which a mass body is adhered to an elastic substrate such as a membrane, or the like, in order to measure acceleration and angular velocity. Through the configuration, the inertial sensor may calculate the acceleration by measuring inertial force applied to the mass body and may calculate the angular velocity by measuring Coriolis force applied to the mass body.

In detail, a scheme of measuring the acceleration and the angular velocity using the inertial sensor is as follows. First, the acceleration may be calculated by Newton's law of motion "F=ma", where "F" represents inertial force applied to the mass body, "m" represents a mass of the mass body, and "a" is acceleration to be measured. Among others, the acceleration a may be obtained by sensing the inertial force F applied to the mass body and dividing the sensed inertial force F by the mass m of the mass body that is a predetermined value. Further, the angular velocity may be calculated by Coriolis force "F=2 mΩ×v", where "F" represents the Coriolis force applied to the mass body, "m" represents the mass of the mass body, "Ω" represents the angular velocity to be measured, and "v" represents the motion velocity of the mass body. Among others, since the motion velocity V of the mass body and the mass m of the mass body are values known in advance, the angular velocity Ω may be calculated by detecting the Coriolis force F applied to the mass body.

Meanwhile, the inertial sensor according to the prior art includes a piezoelectric body that is formed on a membrane so as to drive a mass body or sense a displacement of the mass body, as disclosed in Korean Laid-Open Patent No. 10-2011-0072229. However, when measuring acceleration by sensing the displacement of the mass body using the piezoelectric body as in the prior art, it is difficult to measure static DC acceleration (in particular, gravity acceleration) due to the dissipation of generated charges or characteristics of the piezoelectric body sensitive to temperature.

SUMMARY OF THE INVENTION

The present invention has been made in an effort to provide an inertial sensor capable of continuously measuring DC acceleration through the inertial sensor using a change in a spring constant by continuously applying low frequency voltage in a sine wave form and a method for measuring acceleration using the same.

According to a preferred embodiment of the present invention, there is provided an inertial sensor, including: a membrane; a mass body disposed under the membrane; a sensing unit formed on the membrane and including a piezoelectric body; and a spring constant control unit formed to be spaced apart from the sensing unit and including a piezoelectric body.

DC acceleration may be measured by calculating variations in a displacement of the membrane generated by a change in a spring constant of the membrane and by sensing a charge amount generated in the piezoelectric body by the change amount of the calculated displacement by the sensing unit, by continuously applying voltage in a sine wave form to the spring constant control unit.

The inertial sensor may further include a driving unit formed on the membrane, formed so as to be spaced apart from the sensing unit and the spring constant control unit, and including the piezoelectric body.

The inertial sensor may further include a piezoelectric body formed over and under the membrane, wherein the sensing unit is closer to a center of the piezoelectric body than the driving unit.

The inertial sensor may further include a piezoelectric body formed over or under the membrane, wherein the sensing unit is farther away from the center of the piezoelectric body than the driving unit.

The spring constant control unit may be formed so as to be spaced apart from the sensing unit and be formed in a circular hollow shape.

According to another preferred embodiment of the present invention, there is provided a method for measuring DC acceleration of an inertial sensor, including: applying driving voltage in a sine wave to a spring constant control unit so as to change a spring constant of a membrane; calculating variations of a displacement of the membrane from variations of the spring constant of the membrane; and measuring DC acceleration by sensing a charge amount generated in the piezoelectric body by the variations of the calculated displacement by the sensing unit.

Driving voltage applied to the spring constant control unit may be continuously applied in a sine wave form.

The spring constant control unit may be a driving unit formed in the inertial sensor.

A change rate of a resonant frequency of the membrane to a change rate of driving voltage applied to the spring constant control unit may be ±2% and a spring constant change rate of the membrane may be ±4%.

The spring constant control unit may be formed to be spaced apart from the sensing unit and be formed in a circular hollow shape.

DESCRIPTION OF THE PREFERRED EMBODIMENTS

Figure 1:
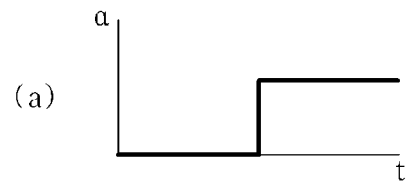
FIG. 1 is a graph showing a relationship of acceleration a, a spring constant k, and a displacement u to static DC acceleration (in particular, gravity acceleration) according to the prior art.
Figure 1:
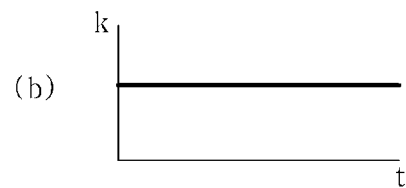
Figure 1:
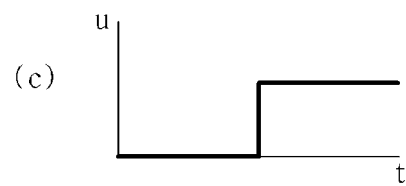

Various objects, advantages and features of the invention will become apparent from the following description of embodiments with reference to the accompanying drawings.

The terms and words used in the present specification and claims should not be interpreted as being limited to typical meanings or dictionary definitions, but should be interpreted as having meanings and concepts relevant to the technical scope of the present invention based on the rule according to which an inventor can appropriately define the concept of the term to describe most appropriately the best method he or she knows for carrying out the invention.

The above and other objects, features and advantages of the present invention will be more clearly understood from the following detailed description taken in conjunction with the accompanying drawings. In the specification, in adding reference numerals to components throughout the drawings, it is to be noted that like reference numerals designate like components even though components are shown in different drawings. In addition, the terms "one side," "the other side," "first," "second," and so on are used to distinguish one element from another element, and the elements are not defined by the above terms. Further, in describing the present invention, a detailed description of related known functions or configurations will be omitted so as not to obscure the subject of the present invention.

Hereinafter, preferred embodiments of the present invention will be described in detail with reference to the accompanying drawings.

Figure 2:
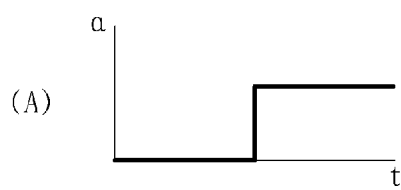
FIG. 2 is a graph showing a relationship of acceleration a, spring constant k, and a displacement u to DC acceleration (in particular, gravity acceleration) according to the preferred embodiment of the present invention.
Figure 2:
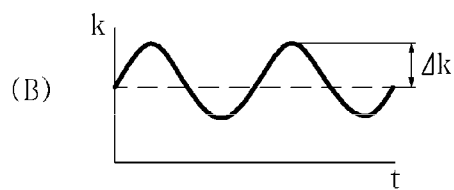
Figure 2:
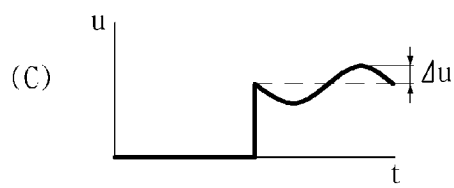
Figure 3:
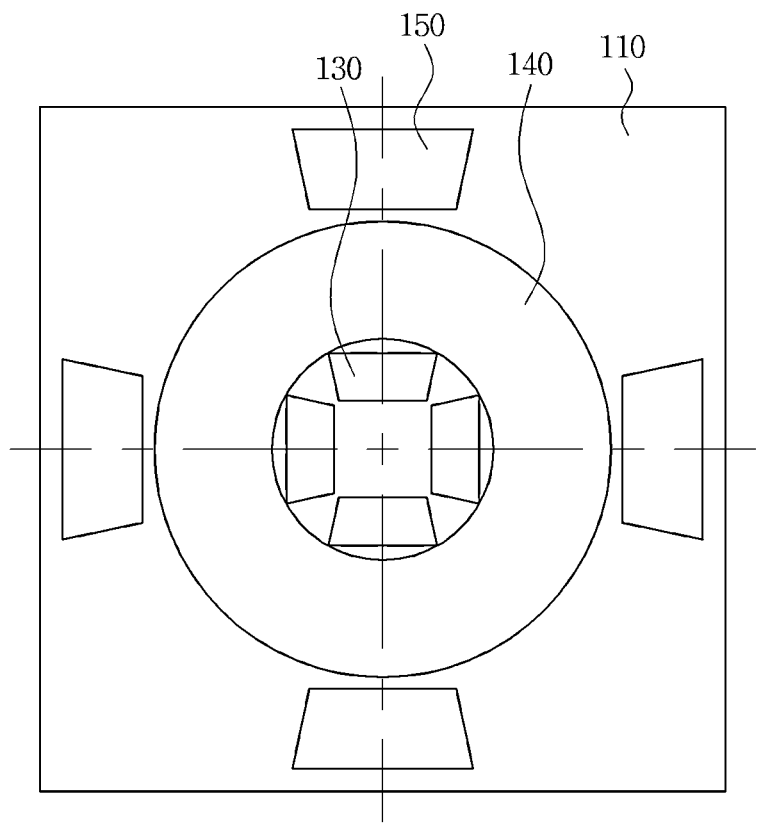
FIG. 3 is a cross-sectional view of a case in which voltage is applied to an inertial sensor according to a preferred embodiment of the present invention.
Figure 4:
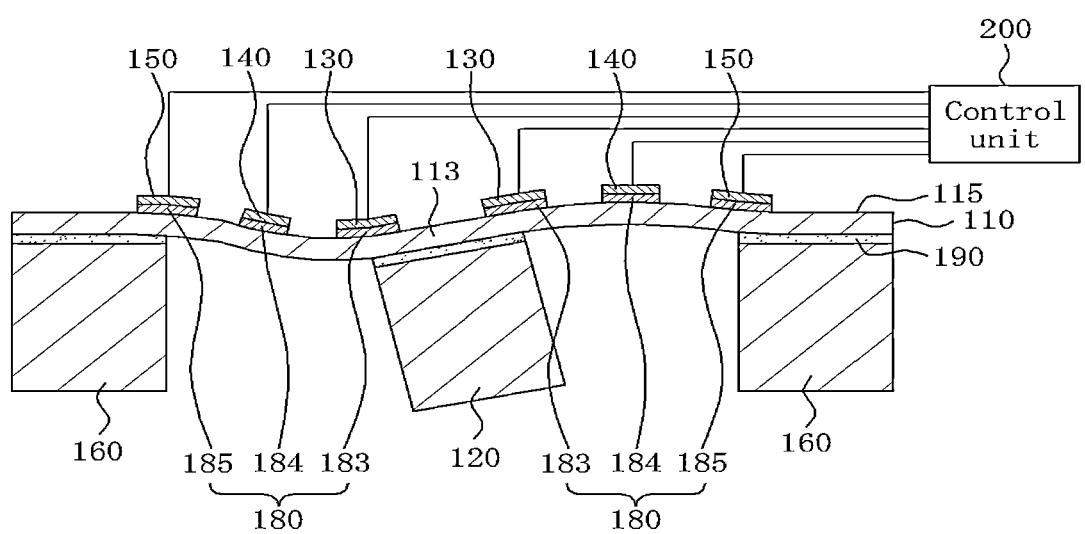
FIG. 4 is a cross-sectional view of a case in which the inertial sensor according to FIG. 3 returns to an original position after being applied with voltage.
Figure 5:
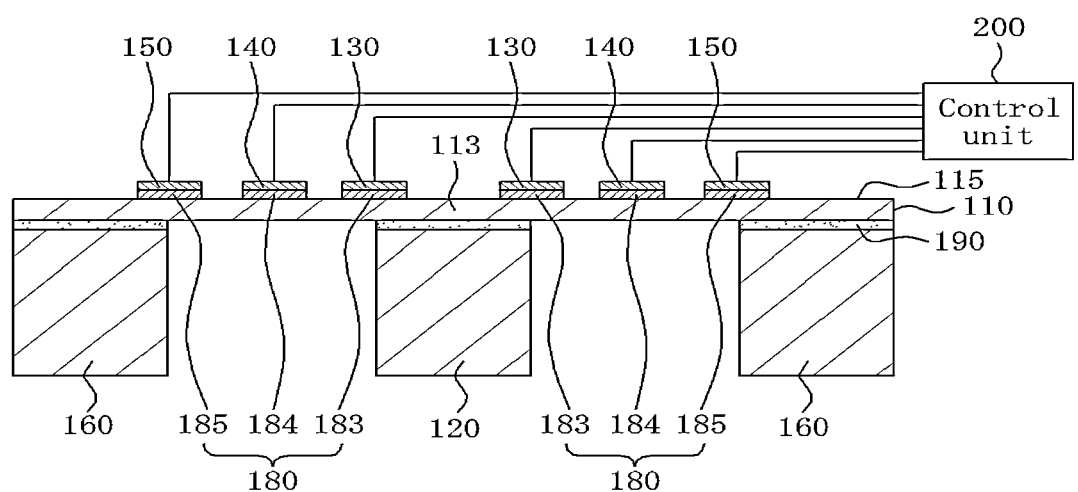
FIG. 5 is a plan view of the inertial sensor according to FIGS. 3 and 4.

FIG. 1 is a graph showing a relationship of acceleration a, a spring constant k, and a displacement u to static DC acceleration (in particular, gravity acceleration) according to the prior art, FIG. 2 is a graph showing a relationship of acceleration a, spring constant k, and a displacement u to DC acceleration (in particular, gravity acceleration) according to the preferred embodiment of the present invention, FIG. 3 is a cross-sectional view of a case in which voltage is applied to an inertial sensor according to a preferred embodiment of the present invention, FIG. 4 is a cross-sectional view of a case in which the inertial sensor according to FIG. 3 returns to an original position after being applied with voltage, and FIG. 5 is a plan view of the inertial sensor according to FIGS. 3 and 4.

An inertial sensor according to a preferred embodiment of the present invention includes a membrane 110, a mass body 120 disposed under the membrane 110, a sensing unit 130 formed on the membrane 110 and including a piezoelectric body, and a spring constant control unit 140 formed to be spaced apart from the sensing unit 130 and including the piezoelectric body.

The membrane 110 is formed in a plate shape and has elasticity so as to displace the mass body 120. In this configuration, a boundary of the membrane 110 is not accurately identified. As shown, the membrane 110 may be partitioned into a central portion 113 of the membrane 110 and an edge 115 disposed along an outside of the membrane 110. In this case, a bottom portion of the central portion 113 of the membrane 110 is provided with the mass body 120 and a bottom portion of the edge 115 of the membrane 110 is provided with a post 160. Therefore, the edge 115 of the membrane 110 is fixed by being supported to the post 160 and the central portion 113 of the membrane 110 based on the edge 115 of the fixed membrane 110 is displaced corresponding to a movement of the mass body 120.

Describing in more detail the mass body 120 and the post 160, the mass body 120 is disposed under the central portion 113 of the membrane 110 and is displaced by inertial force or Coriolis force. In addition, the post 160 is formed in a hollow shape to support the bottom portion of the edge 115 of the membrane 110, such that the post 160 serves to secure a space in which the mass body 120 may be displaced. In this case, the mass body 120 may be formed in, for example, a cylindrical shape and the post 160 may be formed in a square pillar shape having a cavity in a cylindrical shape formed at a center thereof. That is, when being viewed from a transverse section, the mass body 120 is formed in a circular shape and the post 160 is formed in a square shape having a circular opening provided at the center thereof. However, the shape of the mass body 120 and the post 160 is not limited thereto and thus, the mass body 120 and the post 160 may be formed in all the shapes that are known to those skilled in the art. Meanwhile, the above-mentioned membrane 110, the mass body 120, and the post 160 may be formed by selectively etching a silicon substrate such as silicon on insulator (SOI) substrate, or the like.

In addition, since the mass body 120 is bonded to the central portion 113 of the membrane 110 and the post 160 is bonded to the edge 115 of the membrane 110, an adhesive layer 190 may be disposed between the mass body 120 and the central portion 113 of the membrane 110 and between the post 160 and the edge 115 of the membrane 110.

The membrane 110 may be provided with a piezoelectric body 180 to drive the mass body 120 and sense the displacement of the mass body 120. Here, the piezoelectric body 180 may be made of lead zirconate titanate (PZT), barium titanate ($BaTiO_3$), lead titanate ($PbTiO_3$), lithium niobate ($LiNbO_3$), silicon dioxide ($SiO_2$), or the like. In detail, when voltage is applied to the piezoelectric body 180, a reverse piezoelectric effect of expanding and contracting the piezoelectric body 180 is generated. The mass body 120 disposed under the membrane 110 may be driven by using the reverse piezoelectric effect. On the other hand, when stress is applied to the piezoelectric body 180, a piezoelectric effect of generating potential difference is generated. The displacement of the mass body 120 disposed under the membrane 110 may be sensed by using the piezoelectric effect. In addition, in order to use the reverse piezoelectric effect and the piezoelectric effect of the piezoelectric body 180 for each area, the piezoelectric body 180 may be patterned in plural. For example, the piezoelectric body 180 may be patterned as shown in FIG. 3. Here, four piezoelectric bodies disposed at the inside may be the sensing unit 130 sensing the displacement of the mass body 120 (using the piezoelectric effect) and four piezoelectric bodies disposed at the outside may be a driving unit 150 driving the mass body 120 (using the reverse piezoelectric effect). In addition, in the preferred embodiment of the present invention, the separate spring constant control unit 140 may be formed between the sensing unit 130 and the driving unit 150. In addition, the number of patterned spring constant control units 140 and the position of the sensing unit 130 and the driving unit 150 are not limited to the aforementioned configuration and therefore, may be variously changed. For example, when the inertial sensor is used as only an acceleration sensor, there is no need to drive the mass body 120 in order to measure the angular velocity. Therefore, the driving unit 150 may also be omitted.

When using the reverse piezoelectric effect and the piezoelectric effect of the above-mentioned piezoelectric body 180, the inertial sensor may generally measure the acceleration and the angular velocity. However, it is difficult for only the piezoelectric body to measure the static DC acceleration such as the gravity acceleration, or the like, due to the characteristics (dissipation of generated charges or characteristic sensitive to temperature) of the piezoelectric body. However, the preferred embodiment of the present invention artificially changes the spring constant of the membrane 110 to measure variations of a displacement of the membrane 110 that occurs depending on the change in the spring constant and measure a charge amount due to the piezoelectric effect generated from the spring constant control unit 140 including the piezoelectric body depending on the displacement difference of the membrane 110 by the sensing unit 130, thereby measuring applied to the mass body 120. When force F generated by the DC acceleration is applied to the mass body 120, a displacement x may be changed together with the spring constant k (the relationship of F =kx is established). Therefore, when the displacement of the membrane 110 is changed, the charge amount generated due to the piezoelectric effect generated by allowing the spring constant control unit 140 including the piezoelectric body formed on the membrane 110 to apply stress to the piezoelectric body is measured by the sensing unit 130 to measure the DC acceleration applied to the mass body 120.

In the prior art, as shown in FIG. 1, when the DC acceleration is applied, the spring constant k and displacement u are changed by the force of acceleration a that is first applied but the displacement is no further changed by the DC acceleration constantly applied later, such that the charge amount generated through the piezoelectric body is dissipated. As a result, it is impossible to measure the DC acceleration.

However, the preferred embodiment of the present invention artificially and continuously applies the driving voltage in a sine wave form to the spring constant control unit 140 including the piezoelectric body, thereby changing the spring constant. That is, as shown in FIG. 3, when the voltage in the sine wave form is artificially and continuously applied to the piezoelectric body of the spring constant control unit 140, the displacement of the membrane 110 occurs. Then, when voltage is stopped, as shown in FIG. 4, the membrane 110 returns to a position at which the first DC acceleration is applied. In this case, as in the graph shown in FIG. 2, variations of the spring constant k are periodically generated, such that variations of a width in which the displacement u is constant are generated. Charges are generated in the piezoelectric body through the variations of the spring constant k, and the displacement u.

When the displacement of the membrane 110 is changed and voltage is applied to the sensing unit 130 through charges generated in the piezoelectric body, the control unit (not shown) may measure the DC acceleration applied to the mass body 120 by measuring and analyzing the voltage generated in the sensing unit 130. That is, as described above, the displacement of the membrane 110 occurs by changing the spring constant of the membrane 110 and thus, the DC acceleration applied to the mass body 120 may be measured by using the charge amount generated from the piezoelectric body of the spring constant control unit 140 generated according to the variations of the displacement.

The spring constant control unit 140 is formed so as to be spaced apart from the sensing unit 130, including the piezoelectric body. The spring constant may be changed by applying the periodic voltage in the sine wave form to the piezoelectric body of the spring constant control unit 140 when the DC acceleration is applied to the mass body. As described above, the DC acceleration may be finally measured by measuring the variations of the displacement of the membrane based on the variations of the spring constant and measuring the charge amount generated in the piezoelectric body by the sensing unit 130.

In particular, as shown in FIG. 3, the spring constant control unit 140 is spaced apart from the sensing unit 130 so as to be formed in a circular hollow shape but is not limited thereto. That is, the spring constant control unit 140 may also be formed by being patterned like the shape of the sensing unit 130.

Figure 6:
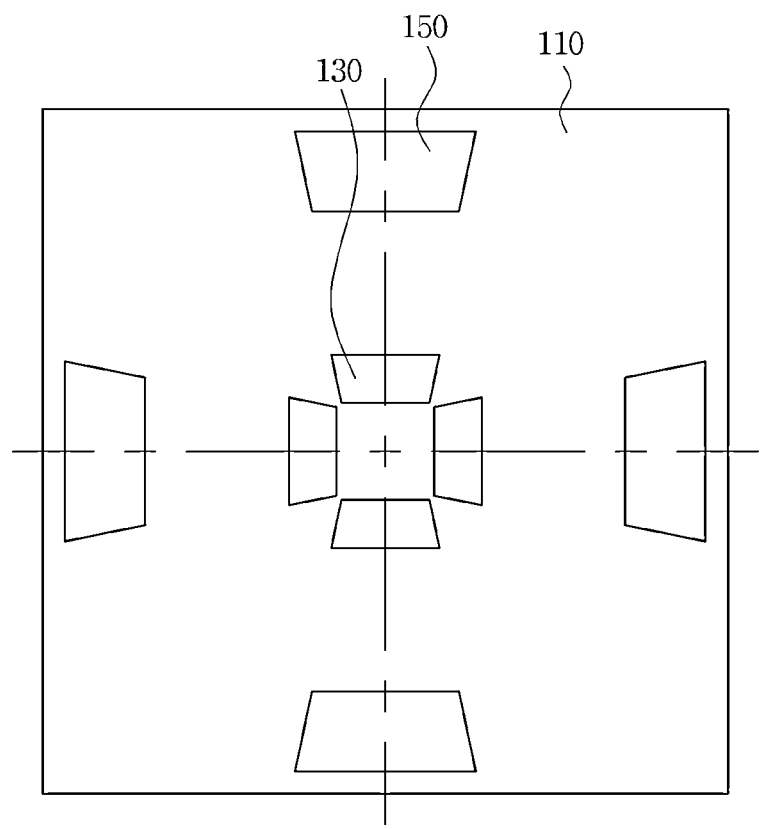
FIG. 6 is a cross-sectional view of a case in which voltage is applied to an inertial sensor according to another preferred embodiment of the present invention.
Figure 7:
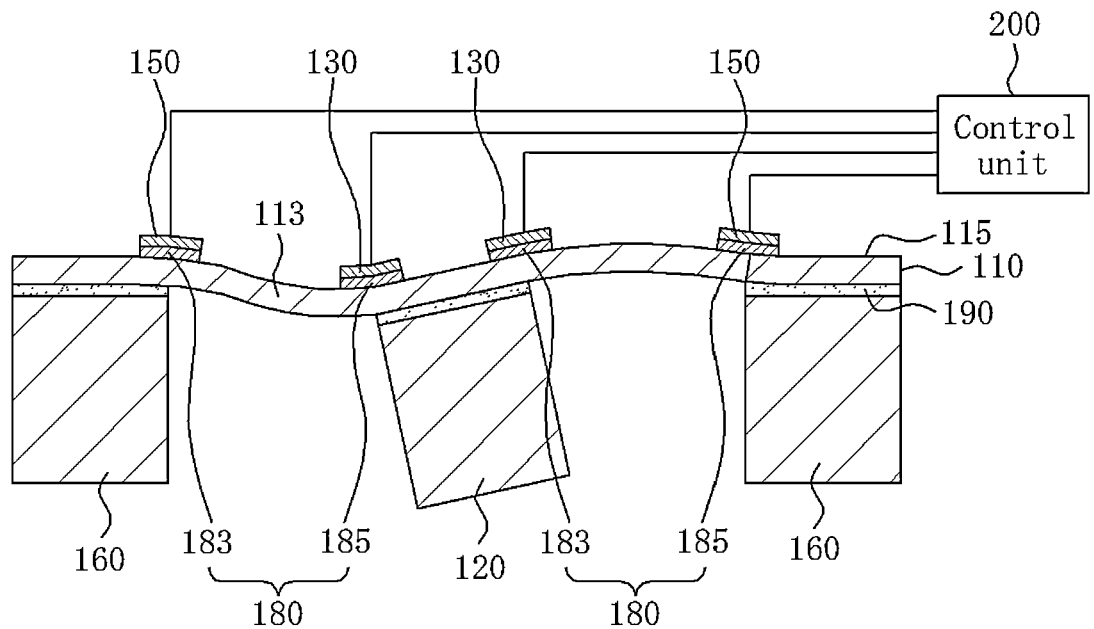
FIG. 7 is a cross-sectional view of a case in which the inertial sensor according to FIG. 6 returns to an original position after being applied with voltage.
Figure 8:
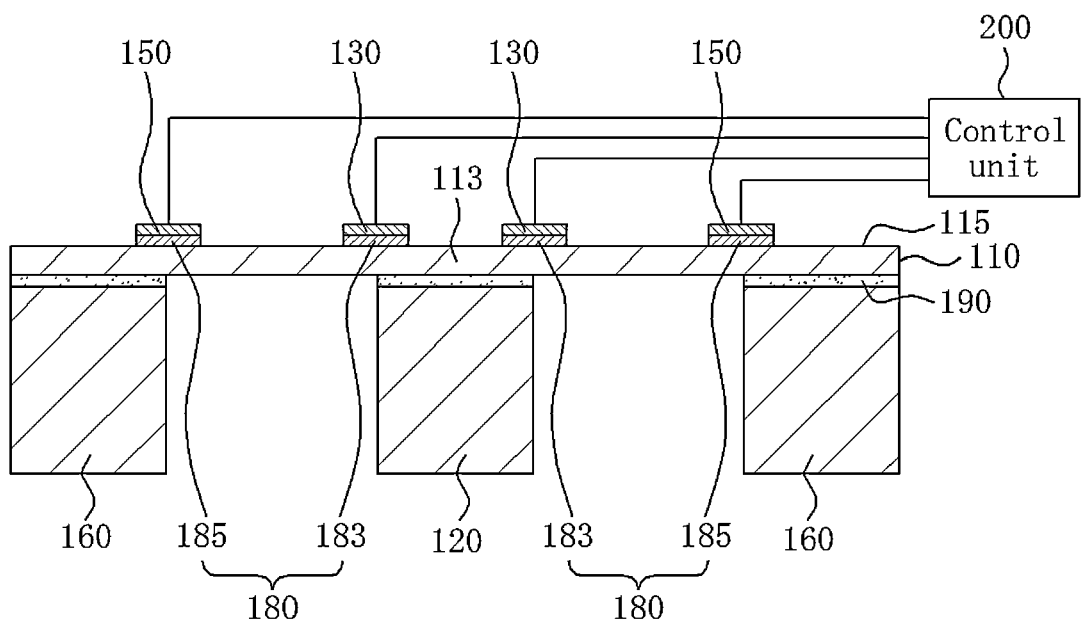
FIG. 8 is a plan view of the inertial sensor according to FIGS. 6 and 7.

In addition, another preferred embodiment of the present invention, when measuring the acceleration of the inertial sensor, there is no need to drive the mass body 120 as described above. Therefore, the driving unit 150 of the prior art may be replaced with the spring constant control unit 140 of the preferred embodiment of the present invention (see FIG. 6). The displacement of the membrane 110 is changed by artificially applying the periodic voltage in the sine wave form to the driving unit 150 shown in FIGS. 7 and 8. Therefore, measuring the DC acceleration through the charge amount generated in the piezoelectric body included in the driving unit 150 is similar to one in the spring constant control unit 140 and the detailed description thereof will be omitted.

The driving unit 150, which is provided to measure the angular velocity, applies the voltage to the piezoelectric body to serve to allow the piezoelectric body to vibrate the membrane 110. That is, similar to the sensing unit 130, the driving unit 150 may be provided with an electrode unit applying voltage. In detail, when voltage is applied to the electrode of the driving unit 150, the driving force is generated by applying electrical energy to the piezoelectric body, thereby vibrating the membrane 110. Through this, the angular velocity may be measured. However, the preferred embodiment of the present invention does not need the separate driving unit 150 in order to measure the acceleration. Therefore, the spring constant control unit 140 instead of the driving unit 150 may be used.

The preferred embodiment of the present invention describes the sensing unit 130 or the spring constant control unit 140 including the piezoelectric body, but the piezoelectric body is formed on the membrane 110 and the sensing unit 130, the spring constant control unit 140, or the driving unit 150 may be separately formed on the piezoelectric body.

The method for measuring the DC acceleration applied to the mass body 120 through the inertial sensor according to the preferred embodiment of the present invention includes: applying the driving voltage in the sine wave to the spring constant control unit 140 for changing the spring constant of the membrane 110, calculating the displacement variations in the membrane 110 from the variations of the spring constant of the membrane 110, and measuring the DC acceleration by sensing the charge amount generated in the piezoelectric body by the variations in the calculated displacement by the sensing unit 130.

The driving voltage applied to the spring constant control unit 140 is continuously applied in the sine wave form.

It can be appreciated that the spring constant control unit 140 may use the driving unit 150 foamed in the inertial sensor.

Figure 9:
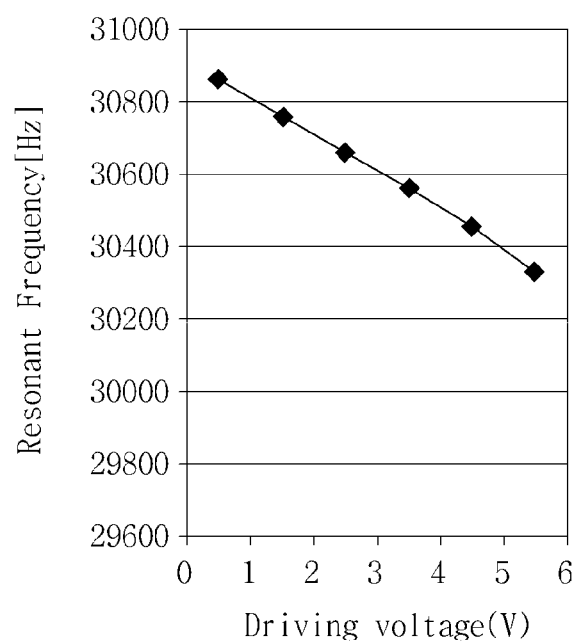
FIG. 9 is a graph showing a relationship between voltage applied to a spring constant control unit according to a preferred embodiment of the present invention and a resonant frequency.

The change rate of the resonance frequency to the change rate of the driving voltage applied to the spring constant control unit 140 is ±2% and thus, the change rate of the spring constant is ±4%. It can be appreciated from FIG. 9 that when voltage is applied in order, the resonant frequency is reduced. That is, when voltage is applied to the piezoelectric body, the frequency (resonant frequency) is changed according to the change in the rigidity of the material. Consequently, the spring constant may be changed according to the change in the resonant frequency. Referring to a graph of FIG. 9, the resonant frequency is change by ±2%. In this case, it can be appreciated that the spring constant is changed by ±4%. Therefore, the spring constant of the membrane 110 may be periodically changed by applying the periodic voltage in the sine wave form to the piezoelectric body.

The spring constant control unit 140 is formed to be spaced apart from the sensing unit 130 and may be formed in a circular hollow shape.

The detailed contents of other configurations and methods are already described above and therefore, the repeated contents thereof will be omitted.

According to the preferred embodiment of the present invention, the DC acceleration (in particular, gravity acceleration) can be measured by using the change in the spring constant without changing the structure of the inertial sensor including the piezoelectric body of the prior art.

Further, the preferred embodiment of the present invention can more reliably measure the DC acceleration (in particular, gravity acceleration) by including the separate spring constant control unit for changing the spring constant.

In addition, the preferred embodiment of the present invention can use the manufacturing process of the inertial sensor including the piezoelectric body of the prior art, thereby improving the productivity of the inertial sensor capable of measuring the DC acceleration (in particular, gravity acceleration).

Although the preferred embodiments of the present invention have been disclosed for illustrative purposes, they are for specifically explaining the present invention and thus an inertial sensor and a, method for measuring acceleration using the same according to the present invention are not limited thereto, but those skilled in the art will appreciate that various modifications, additions and substitutions are possible, without departing from the scope and spirit of the invention as disclosed in the accompanying claims.

Accordingly, such modifications and alterations should also be understood to fall within the scope of the present invention. A specific protective scope of the present invention could be defined by the accompanying claims.

What is claimed is:

1. An inertial sensor, comprising:
    a membrane;
    a mass body disposed under the membrane;
    a sensing unit formed on the membrane and including a piezoelectric body;
    a spring constant control unit formed to be spaced apart from the sensing unit and including a piezoelectric body; and
    a control unit measuring DC acceleration by using a charge amount measured by the sensing unit,
    wherein the control unit continuously applies voltage in a sine wave form to the spring constant control unit, resulting in a change in a spring constant of the membrane and a displacement of the membrane, and the sensing unit senses a charge amount generated in the piezoelectric body of the sensing unit caused by variations of the measured displacement of the membrane.

2. The inertial sensor as set forth in claim 1, wherein the spring constant control unit is formed so as to be spaced apart from the sensing unit and is formed in a circular hollow shape.

3. The inertial sensor as set forth in claim 1, further comprising a driving unit formed on the membrane, formed so as to be spaced apart from the sensing unit and the spring constant control unit, and including a piezoelectric body.

4. The inertial sensor as set forth in claim 3, wherein the sensing unit is closer to a center of the membrane than the driving unit.

5. The inertial sensor as set forth in claim 3, wherein the sensing unit is farther away from the center of the membrane than the driving unit.

6. A method for measuring acceleration of an inertial sensor, comprising:
    applying driving voltage in a sine wave to a spring constant control unit by a control unit so that a spring constant of a membrane including a mass body can be changed when a DC acceleration is applied to the mass body;
    measuring variations of a displacement of the membrane caused by variations of the spring constant of the membrane;
    sensing a charge amount generated in a piezoelectric body of a sensing unit caused by the variations of the measured displacement of the membrane; and
    measuring DC acceleration by using the charge amount sensed by the sensing unit.

7. The method as set forth in claim 6, wherein driving voltage applied to the spring constant control unit is continuously applied in a sine wave form.

8. The method as set forth in claim 6, wherein the spring constant control unit is a driving unit formed in the inertial sensor.

9. The method as set forth in claim 6, wherein a change rate of a resonant frequency of the membrane to a change rate of driving voltage applied to the spring constant control unit is ±2% and a spring constant change rate of the membrane is ±4%.

10. The method as set forth in claim 6, wherein the spring constant control unit is formed to be spaced apart from the sensing unit and is formed in a circular hollow shape.

* * * * *